United States Patent
Park et al.

(10) Patent No.: US 8,284,875 B2
(45) Date of Patent: Oct. 9, 2012

(54) METHODS AND SYSTEMS FOR FREQUENCY DOMAIN GAIN CONTROL IN OFDM MIMO SYSTEMS

(75) Inventors: Jong Hyeon Park, San Jose, CA (US); Michael L. McCloud, San Diego, CA (US); Brian C. Banister, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 357 days.

(21) Appl. No.: 12/688,760

(22) Filed: Jan. 15, 2010

(65) Prior Publication Data
US 2010/0202571 A1 Aug. 12, 2010

Related U.S. Application Data

(60) Provisional application No. 61/150,727, filed on Feb. 6, 2009.

(51) Int. Cl.
*H04L 27/06* (2006.01)

(52) U.S. Cl. ........ 375/341; 375/260; 375/267; 375/340; 375/344; 375/345; 375/347; 455/75; 455/101; 455/119; 455/132; 455/173.1; 455/182.1; 455/182.2; 455/192.1; 455/192.2; 455/232.1; 455/234.1; 455/296; 455/500; 455/562.1; 370/334; 341/173; 714/794; 714/795; 714/796

(58) Field of Classification Search .......... 375/260, 375/267, 340, 341, 344, 345, 347; 455/75, 455/101, 119, 132, 173.1, 182.1, 182.2, 192.1, 455/192.2, 232.1, 234.1, 296, 500, 562.1; 370/334; 341/173; 714/794, 795, 796
See application file for complete search history.

(56) References Cited

U.S. PATENT DOCUMENTS

| | | | |
|---|---|---|---|
| 2008/0056396 A1* | 3/2008 | Li | 375/260 |
| 2010/0027693 A1* | 2/2010 | Vijayan et al. | 375/260 |
| 2010/0027702 A1* | 2/2010 | Vijayan et al. | 375/267 |

FOREIGN PATENT DOCUMENTS

| | | |
|---|---|---|
| EP | 1460813 | 9/2004 |
| WO | WO2008027554 | 3/2008 |

OTHER PUBLICATIONS

Davis, Linda M.: "Scaled and decoupled Cholesky and QR Decompositions with Application to Spherical MIMO Detection," IEEE WCNC 2003—IEEE Wireless Communications and Networking Conference, New Orleans, LA, USA (Mar. 16, 2003), pp. 326-331, XP002602159, Retrieved from the Internet: http://ieeexplore.ieee.org/stamp/stamp.jsp?arnumber=01200369 [retrieved on Sep. 24, 2010], Section IV. Scaled and Decoupled QR (SDQR) Decomposition table 1 on p. 328.

(Continued)

*Primary Examiner* — Leon Flores
(74) *Attorney, Agent, or Firm* — Tyler Overall (57) ABSTRACT

Certain embodiments of the present disclosure provide a method for frequency-domain gain control in system utilizing orthogonal frequency division multiplexing (OFDM) multiple input multiple output (MIMO). The proposed method reduces the complexity of the system while maximizing the internal accuracy of the OFDM MIMO decoder and preserving the performance of the system.

32 Claims, 7 Drawing Sheets

OTHER PUBLICATIONS

International Search Report and Written Opinion—PCT/US2010/023417, International Search Authority—European Patent Office—Oct. 6, 2010.

Kim, Hun Seok, et al.: "An Efficient FPGA based MIMO-MMSE Detector," 15th European Signal Processing Conference (EUSIPCO 2007), Poznan, Poland, (Sep. 3, 2007), pp. 1131-1135, XP002602160, Table 1 and Section 3.2 Algorithm enhancement for Gram-Schmidt based QR.

Muruganathan, Siva D.: "A Computationally Efficient QR-Successive Interference Cancellation Scheme for Simplified Receiver Implementation in SFBC-OFDM Systems," IEEE Transactions on Wireless Communications, vol. 6, No. 10, (Oct. 1, 2007) Piscataway, NJ, US, DOI : 10.1109/TWC.2007.060041, pp. 3641-3647, XP011194410, ISSN: 1536-1276, Section III: SDRQR-SIC for SFBC-OFDM on p. 3642-3643.

* cited by examiner

METHODS AND SYSTEMS FOR FREQUENCY DOMAIN GAIN CONTROL IN OFDM MIMO SYSTEMS

CLAIM OF PRIORITY

This application claims the benefit of priority from U.S. Provisional Patent Application Ser. No. 61/150,727, entitled "Methods and Systems for Frequency Domain Gain Control in OFDM MIMO Systems" and filed Feb. 6, 2009, which is assigned to the assignee of this application and is fully incorporated herein by reference for all purposes.

TECHNICAL FIELD

Certain embodiments of the present disclosure generally relate to wireless communications and, more particularly, to gain control in frequency domain for orthogonal frequency division multiplexing (OFDM) multiple input multiple output (MIMO) systems.

BACKGROUND

An OFDM multiple input multiple output (MIMO) signal may exhibit high peak to average power ratios (PAPR) in both time and frequency domains. Traditionally, a time domain gain control scheme is used to get constant signal level to maximize finite precision performance while minimizing hardware complexity. However, in an OFDM MIMO system, a frequency domain signal (i.e., the signal after FFT) may still show high PAPR even after time domain gain control is applied.

The high PAPR values of frequency domain OFDM MIMO signals may require a large dynamic range for hardware architectures of OFDM MIMO decoders to preserve their original performance, which is expensive.

SUMMARY

Certain embodiments provide a method for wireless communications. The method generally includes calculating power of an estimated whitened channel matrix for each of one or more subcarriers, calculating a first scaling matrix and a second scaling matrix based on the calculated power, performing frequency domain gain control by scaling a whitened received signal using the first scaling matrix and scaling a whitened channel matrix using the second scaling matrix, and performing multiple-input multiple-output (MIMO) decoding on at least the scaled whitened received signal and the scaled whitened channel matrix.

Certain embodiments provide an apparatus for wireless communications. The apparatus generally includes means for calculating power of an estimated whitened channel matrix for each of one or more subcarriers, means for calculating a first scaling matrix and a second scaling matrix based on the calculated power, means for performing frequency domain gain control by scaling a whitened received signal using the first scaling matrix and scaling a whitened channel matrix using the second scaling matrix, and means for performing multiple-input multiple-output (MIMO) decoding on at least the scaled whitened received signal and the scaled whitened channel matrix.

Certain embodiments provide an apparatus for wireless communications. The apparatus generally includes logic for calculating power of an estimated whitened channel matrix for each of one or more subcarriers, logic for calculating a first scaling matrix and a second scaling matrix based on the calculated power, logic for performing frequency domain gain control by scaling a whitened received signal using the first scaling matrix and scaling a whitened channel matrix using the second scaling matrix, and logic for performing multiple-input multiple-output (MIMO) decoding on at least the scaled whitened received signal and the scaled whitened channel matrix.

Certain embodiments of the present disclosure provide a computer-program product for wireless communications, comprising a computer readable medium having instructions stored thereon, the instructions being executable by one or more processors. The instructions generally include instructions for calculating power of an estimated whitened channel matrix for each of one or more subcarriers, instructions for calculating a first scaling matrix and a second scaling matrix based on the calculated power, instructions for performing frequency domain gain control by scaling a whitened received signal using the first scaling matrix and scaling a whitened channel matrix using the second scaling matrix, and instructions for performing multiple-input multiple-output (MIMO) decoding on at least the scaled whitened received signal and the scaled whitened channel matrix.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These two standards define at least four different physical layers (PHYs) and one media access control (MAC) layer. The OFDM and OFDMA physical layer of the four physical layers are the most popular in the fixed and mobile BWA areas respectively.

Figure 1:
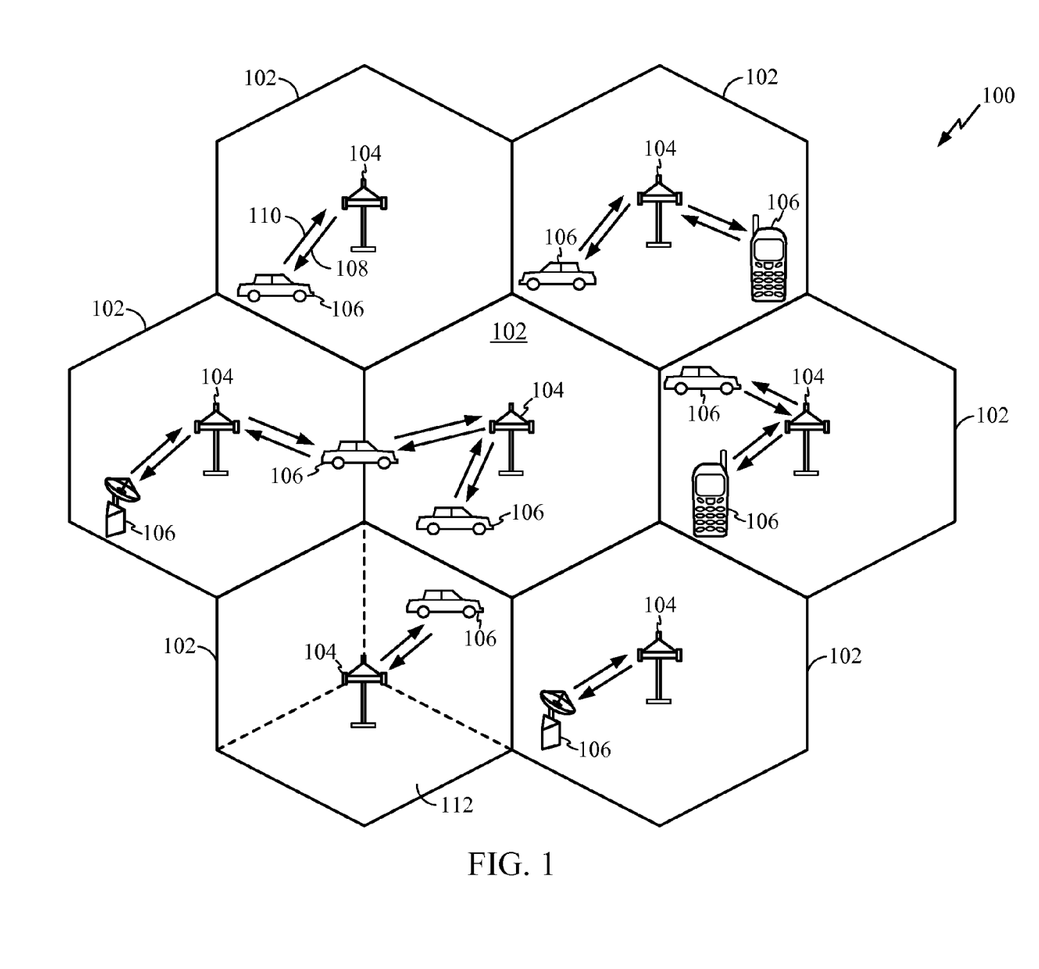
FIG. 1 illustrates an example wireless communication system, in accordance with certain embodiments of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
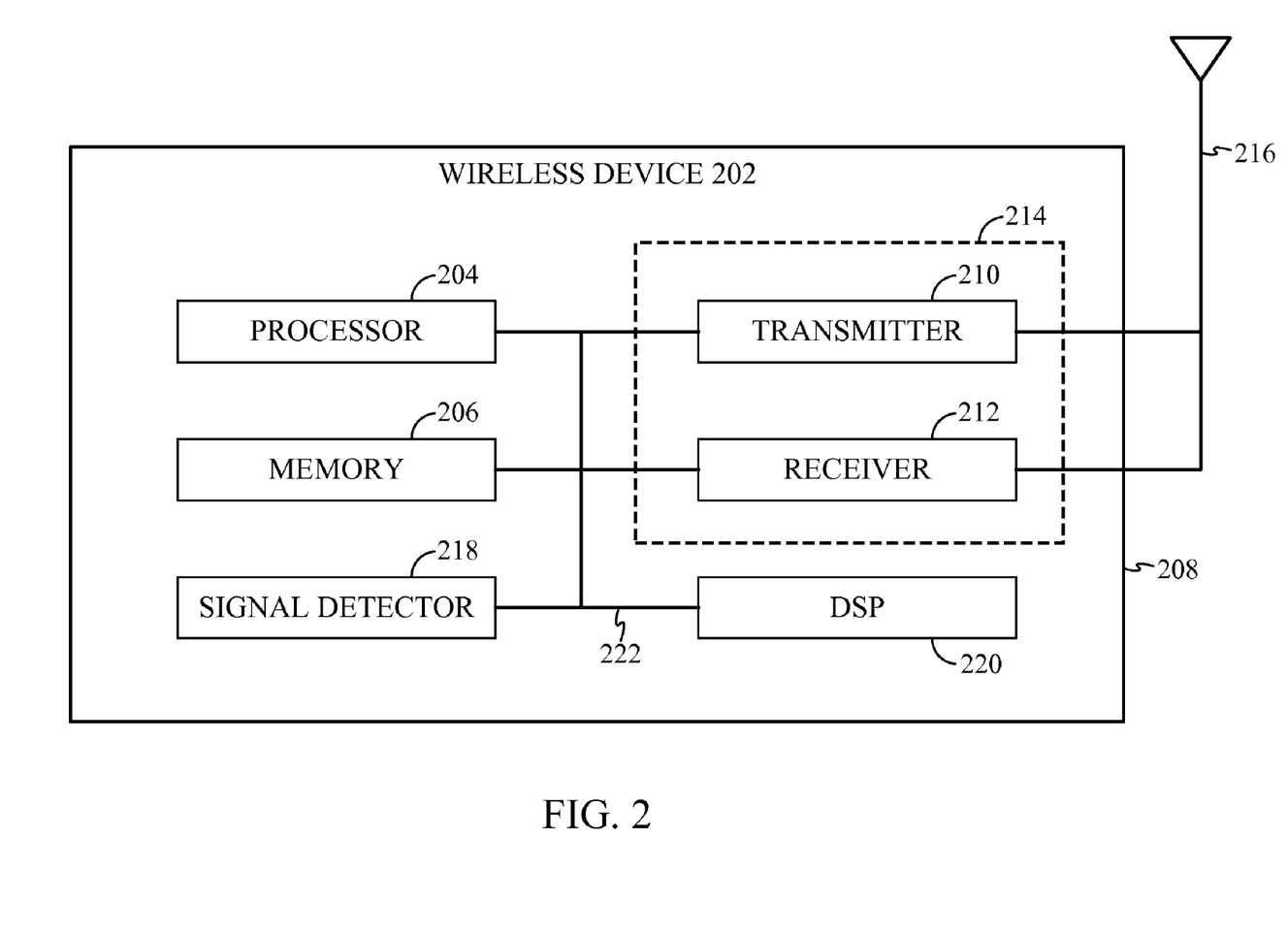
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
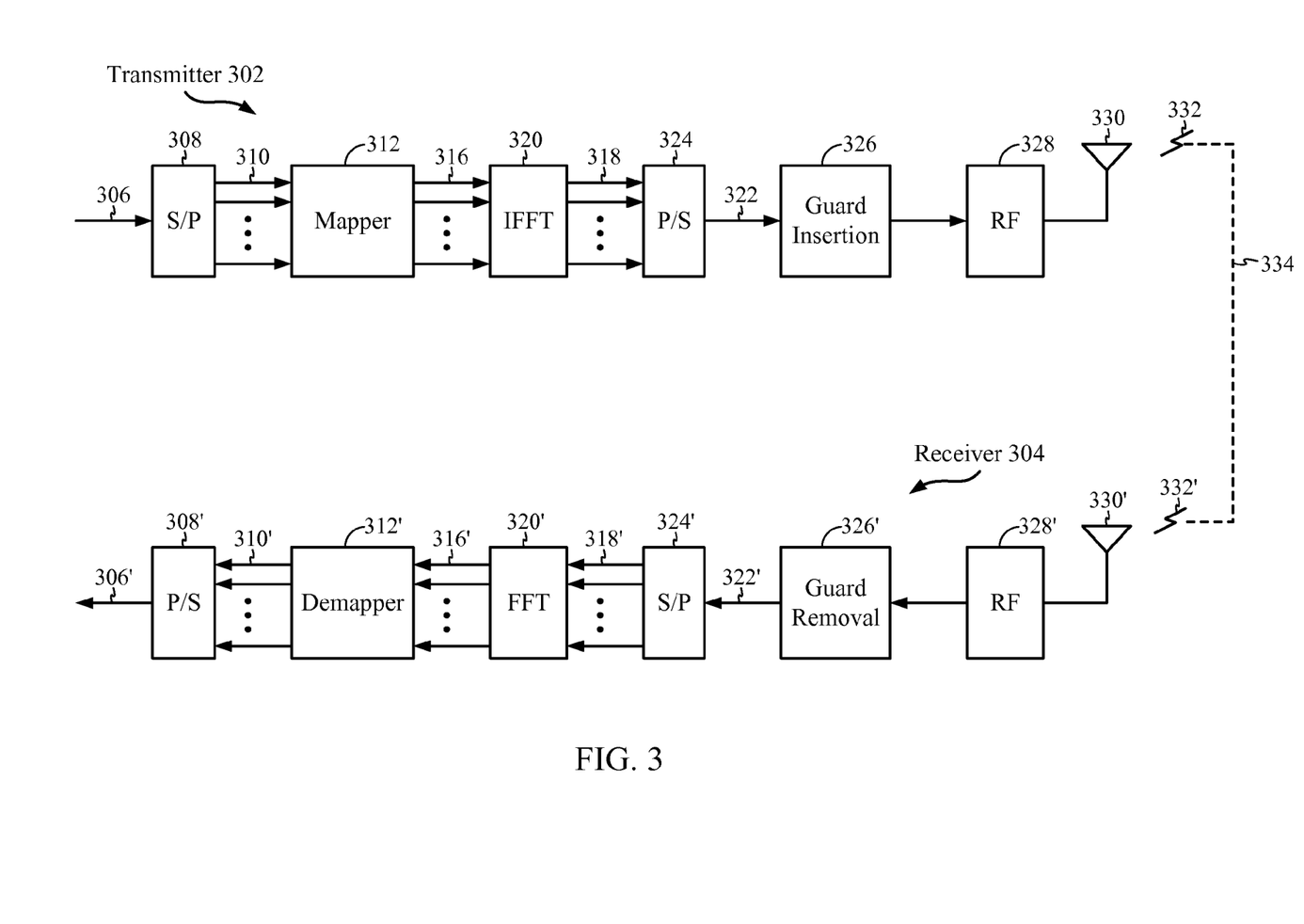
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Frequency Domain Gain Control in OFDM MIMO Systems

An OFDM multiple input multiple output (MIMO) signal may be exhibiting high peak to average power ratios (PAPR) in both time and frequency domains. The PAPR refers to the ratio of the peak value of a signal to its typical or average value. High values of PAPR may lead to a necessity to utilize expensive circuits with linear characteristics within a large dynamic range. Otherwise, the signal clipping at high levels may lead to a distortion of the signal and performance degradation in the system.

In conventional OFDM MIMO systems, a time domain gain control scheme may be utilized to get constant signal level. By employing a gain control scheme, performance of a system operating with finite precision may be improved while reducing its hardware complexity. In an OFDM MIMO system, after a signal passes through gain control circuits in time domain, the signal may still show high PAPR values when is transferred to the frequency domain (i.e., the signal after fast Fourier transform (FFT)).

For certain embodiments of the present disclosure, a frequency domain gain control technique may be employed for every OFDM sub-carrier in an OFDM MIMO system. Utilizing a frequency domain gain control may reduce implementation complexity while maximizing the internal accuracy of the OFDM MIMO decoder and preserving the performance of the system.

Figure 4:
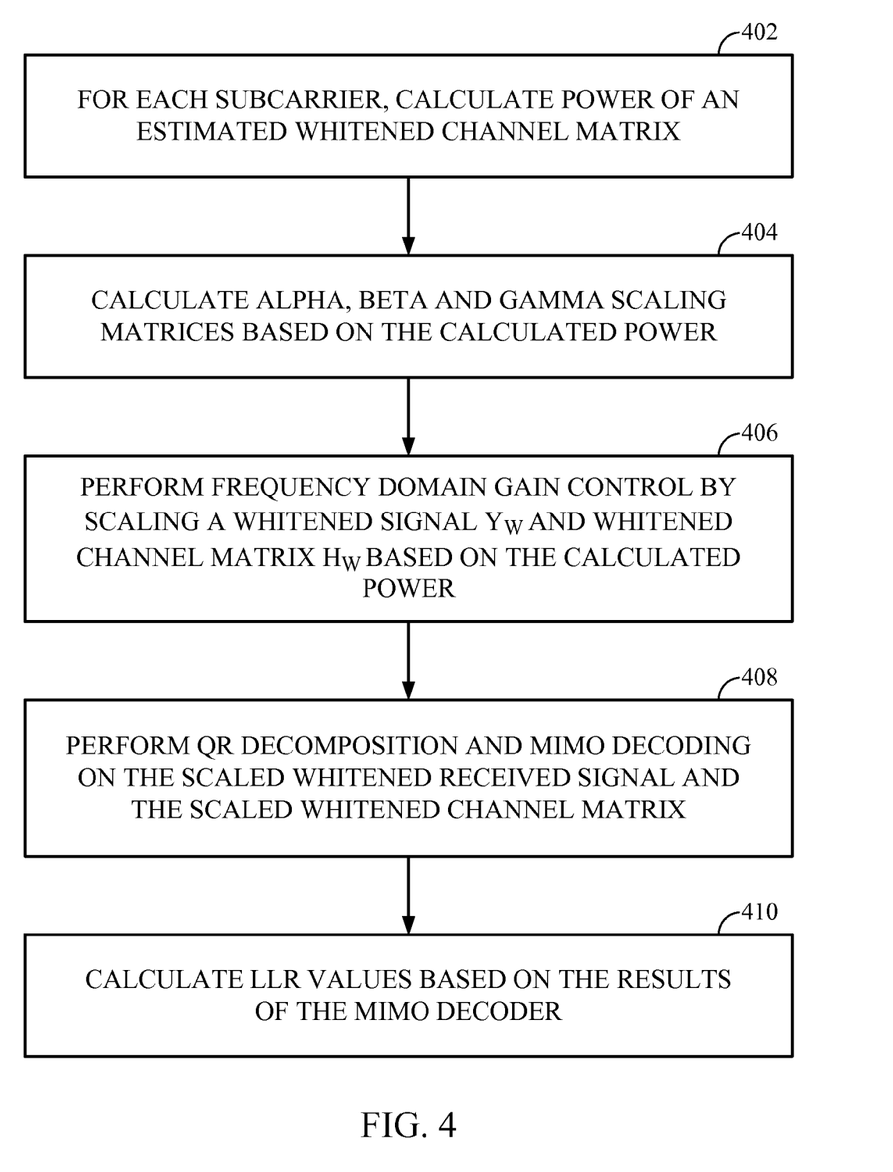
FIG. 4 illustrates example operations for a frequency domain gain control technique for OFDM MIMO systems, in accordance with certain embodiments of the present disclosure.

FIG. 4 illustrates example operations for the proposed frequency domain gain control technique for OFDM MIMO systems, in accordance with certain embodiments of the present disclosure. At 402, power of estimated whitened channel matrix is calculated for each of one or more subcarriers. At 404, three scaling matrices are generated based on the calculated power of the whitened channel matrix. The first scaling matrix may be an α-scaling matrix, the second scaling matrix may be a γ-scaling matrix and the third scaling matrix may be a β-scaling matrix.

At 406, frequency domain gain control is performed by scaling a whitened signal and a whitened channel matrix using the scaling matrices. At 408, QR decomposition and MIMO decoding are performed on the scaled whitened received signal and the scaled whitened channel matrix to obtain a plurality of output values. At 410, log likelihood ratios (LLR) are calculated based on the plurality of the output values of the MIMO decoder.

Figure 5:
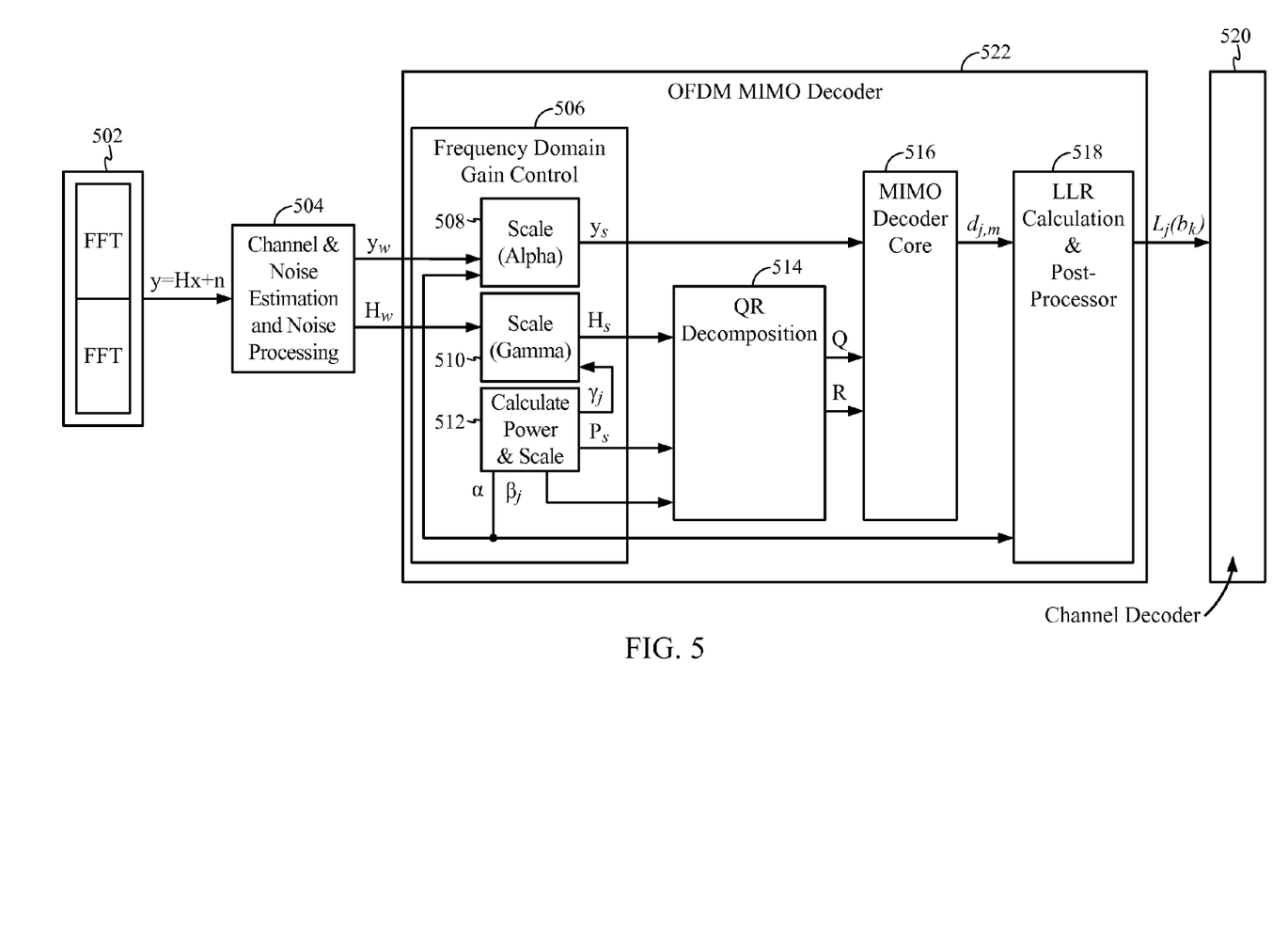
FIG. 5 illustrates a block diagram of OFDM MIMO decoder utilizing frequency domain gain control, in accordance with certain embodiments of the present disclosure.

FIG. 5 illustrates an example OFDM MIMO decoder utilizing the proposed frequency domain gain control technique, in accordance with certain embodiments of the present disclosure. An OFDM received signal enters the channel estimation and noise-processing block 504 after passing through FFT blocks 502. The channel estimation and noise processing block generates a whitened channel matrix $H_w$ and a whitened received signal $y_w$. The whitening transformation is a de-correlation method that converts the covariance matrix of a set of samples into the identity matrix. This effectively creates new random variables that are uncorrelated and have the same variances as the original random variables.

The OFDM MIMO decoder 522 inputs the whitened channel matrix $H_w$ and the whitened signal $y_w$ and generates log likelihood ratios (LLR) for a channel decoder 520. The OFDM MIMO decoder 522 may include four sub-processors as described below.

A frequency domain gain control block 506 may control the power of each OFDM sub-carrier. The frequency domain gain control block may contain an α-scaling block 508 and a γ-scaling block 510, in addition to a block 512 for calculating power and β-scaling matrix. A QR decomposition block 514 may perform QR decomposition on the scaled channel estimation matrix to generate an orthogonal matrix Q and an upper triangular matrix R.

A MIMO decoder core 516 may perform maximum likelihood MIMO decoding using the scaled received signal $y_s$, Q and R matrices. Outputs of the MIMO decoder core may be distance values $d_{j,m}$, where j represents the $j^{th}$ stream, j=1, 2 ..., J, and m represents the $m^{th}$ constellation point, m=1, 2, ..., M.

An LLR calculation and post-processing block 518 may calculate LLR values by utilizing the distance values $d_{j,m}$ from the MIMO decoder. Outputs of the LLR calculation block are a set of LLR values $L_j(b_k)$ for $k^{th}$ bit of the $j^{th}$ stream, where k=1, 2, ..., K.

For certain embodiments of the present disclosure, frequency domain gain control may be performed by calculating the power of each subcarrier from the estimated channel and the whitened channel $H_w$. The whitened signal $y_w$ may be scaled based on the calculated power.

For certain embodiments, power of the elements and columns of the channel matrix $H_w$ may be employed to scale the channel matrix and the received signal. It may be assumed that $h_{w,ij}$, the element in the $i^{th}$ row and $j^{th}$ column of $H_w$, has infinite or sufficiently large precision. Therefore, the following equations may be used to calculate the power values $P_{w,ij}$ for each element $h_{w,ij}$ and $P_{w,j}$ for each column of the channel matrix $H_w$:

$$P_{w,ij} = conj(h_{w,ij}) \cdot h_{w,ij} = (real(h_{w,ij}))^2 + (imag(h_{w,ij}))^2 \quad (1)$$
$h_{w,ij}$ is ij element of $H_w$, $i = 1, \ldots, N_r$, $j = 1, \ldots, N_t$ $$P_{w,j} = \sum_{i=1}^{N_r} P_{w,ij}, \quad j = 1, \ldots, N_t \quad (2)$$

where conj(.), real(.) and imag(.) provide the conjugate, real and imaginary parts of a complex number, respectively. In addition, $N_r$ represents number of receive antennas and $N_t$ represents number of transmitting antennas For certain embodiments of the present disclosure, an element-wise scaling matrix $D_\alpha$ may be used to scale every element of whitened channel and signal using maximum power of $P_{w,ij}$, i=1,...,N, j=1,...,N. Inverse of the $D_\alpha$ matrix may be utilized in the LLR block.

$$y_s^T = y_\alpha^T = y_w^T D_\alpha \quad (3)$$

$$H_\alpha = H_w D_\alpha \quad (4)$$
where, $$D_\alpha = \begin{pmatrix} 2^{-\alpha} & 0 \\ 0 & 2^{-\alpha} \end{pmatrix}, \text{ and} \quad (5)$$

$\alpha = \text{floor}((\log_2(P_{w,max}))/2)$ $P_{w,max} = \max_{ij}(P_{w,ij})$ where floor(A) rounds the elements of A to the nearest integers less than or equal to A, and $\log_2(.)$ provides logarithm in base 2.

For certain embodiments of the present disclosure, a column-wise scaling matrix $D_\beta$ may be utilized to scale every column of the $\alpha$-scaled channel matrix. Inverse of $\beta$-scaling may be performed after QR decomposition.

$$H_\beta = H_\alpha D_\beta \quad (6)$$
where, $$D_\beta = \begin{pmatrix} 2^{-\beta_1} & 0 \\ 0 & 2^{-\beta_2} \end{pmatrix}, \quad (7)$$

$\beta_j = \text{floor}((\log_2(P_{\alpha,j}))/2)$, and $\quad (8)$ $P_{\alpha,j} = h_\alpha^H h_{\alpha,j} \quad (9)$ $h_{\alpha,j}$ is $j^{th}$ column vector of $H_\alpha$.

For certain embodiments, the matrices $D_\alpha$ and $D_\beta$ may be integrated into a $\gamma$-scaling matrix $D_\gamma$. Therefore, a channel matrix $H_w$ may be scaled by $D_\gamma$ that performs both $\alpha$ and $\beta$-scaling simultaneously, as follows:

$$H_s = H_\gamma = H_w D_\gamma \quad (10)$$
where, $$D_\gamma = \begin{pmatrix} 2^{-\gamma_1} & 0 \\ 0 & 2^{-\gamma_2} \end{pmatrix}, \text{ and} \quad (11)$$

$\gamma_j = \text{floor}((\log_2(P_{w,j}))/2). \quad (12)$

The following relations may hold between the scaling factors $\alpha$, $\beta$ and $\gamma$:

$\gamma_j = \alpha + \beta_j$ $\beta_j = \gamma_j - \alpha$

For certain embodiments, values of the scaling factors $\alpha$, $\beta_j$, and $\gamma_j$ may be extracted from the most significant bits (MSB) of the corresponding signal. Scaling may also be implemented by shift operations. As described above, the proposed scaling technique reduces required bit-width and hardware size while maintaining the bit error rate (BER) performance of a MIMO OFDM system.

For certain embodiments of the present disclosure, power of each column of the channel matrix $H_s$ may be utilized while performing QR decomposition. Power per column of the $\gamma$-scaled channel matrix $H_s$ may directly be calculated from $H_s$ after $\gamma$-scaling. Another approach is to reuse the already calculated power $P_{w,j}$ of columns of the channel matrix $H_w$. The above two approaches are fundamentally similar in floating point operation but the results may be slightly different in fixed-point operation because of quantization error.

$P_s = P_\gamma = P_{wj} D_\gamma^2 \quad (13)$ $P_{w,j}$ is $j^{th}$ element of row vector $P_{wj}$ For certain embodiments of the present disclosure, a scaled QR decomposition may be employed. Columns of a $\alpha$-scaled channel matrix $H_\alpha = QR$ may be scaled by $\beta$-scaling matrix as described in frequency domain gain control block with the following equation:

$H_s = H_\gamma = H_\alpha D_\beta \quad (14)$ where $D_\beta$ is a diagonal matrix with dimension $N_t \times N_t$. Therefore, scaled QR decomposition of $H_s$ may be written as follows:

$H_s = Q_s R_s \quad (15)$ $H_\alpha D_\beta = Q_s R_s \quad (16)$ $H_\alpha = Q_s R_s D_\beta^{-1} \quad (17)$ As a result, $R_s$ may be scaled by $D_\beta^{-1}$ whereas $Q_s$ may be used directly after scaled QR decomposition. Therefore, the following relations may hold:

$$Q=Q_s \quad (18)$$

$$R=R_s D_\beta^{-1} \quad (19)$$

Two example OFDM MIMO systems are simulated that employ either infinite precision or finite precision with the proposed frequency domain gain control. The following parameters are considered for the simulations: a WiMAX system with 64-quadrature amplitude modulation (QAM), convolutional turbo coding (CTC) with rates r=1/2, and 5/6, MIMO (SM) with two transmit and two receive antennas (Rate 2) with Vertical encoding, Pedestrian-A fading channel model with a speed equal to 3 km/h ($F_d$=6 Hz).

Figure 6A:
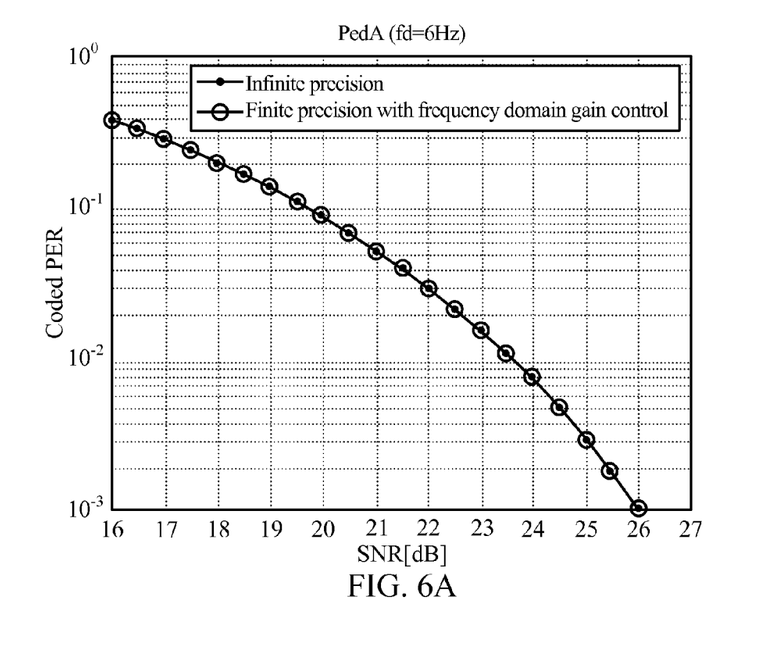
FIGS. 6A and 6B illustrate performance results for two OFDM MIMO systems using either finite precision with frequency domain gain control or infinite precision, in accordance with certain embodiments of the present disclosure.
Figure 6B:
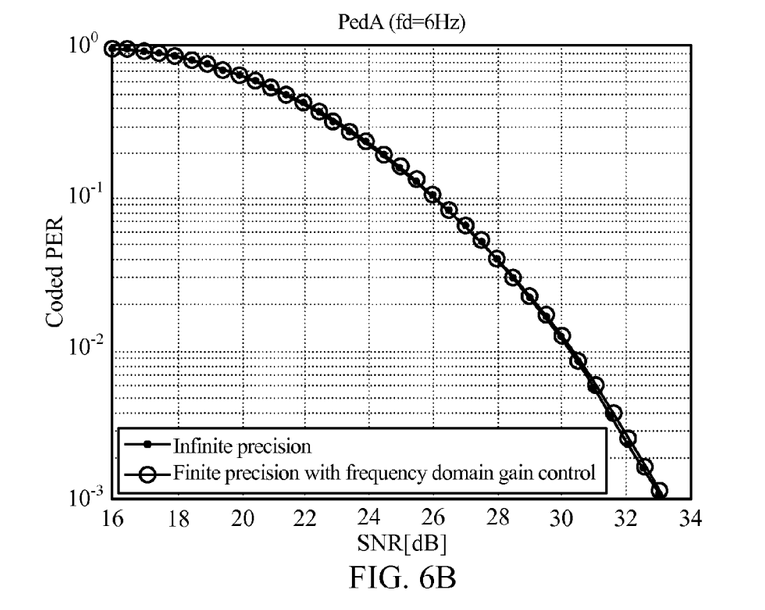

The simulation results are illustrated in FIGS. 6A and 6B for coding rates of 1/2 and 5/6, respectively. As illustrated, the performance results for a system using finite precision with frequency-domain gain control may be very close to the results for a system with infinite precision. However, the hardware complexity is much lower in the system that employs frequency-domain gain control.

Certain embodiments proposed techniques for frequency-domain gain control in OFDM MIMO systems. The proposed techniques reduce the complexity of the system while maximizing the internal accuracy of the OFDM MIMO decoder and preserving the performance of the system.

Figure 4A:
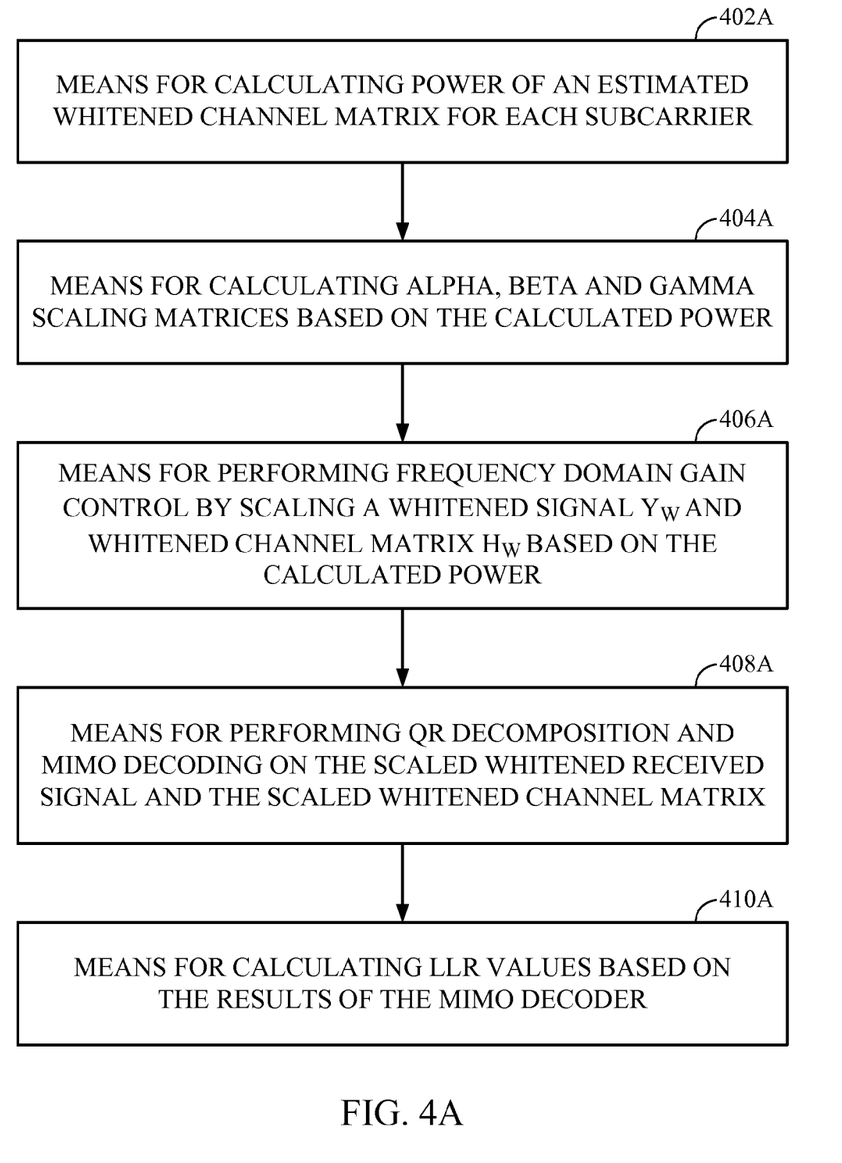
FIG. 4A illustrates example components capable of performing the operations in FIG. 4.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, operations 400 illustrated in FIG. 4 corresponds to means-plus-function blocks 400A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising: calculating power of an estimated whitened channel matrix for each of one or more subcarriers; calculating a first scaling matrix and a second scaling matrix based on the calculated power; performing frequency domain gain control by scaling a whitened received signal using the first scaling matrix and scaling a whitened channel matrix corresponding to the whitened received signal using the second scaling matrix, wherein the first scaling matrix and the second scaling matrix are different matrices; and performing multiple-input multiple-output (MIMO) decoding on at least the scaled whitened received signal and the scaled whitened channel matrix, wherein calculating the power of the estimated whitened channel matrix, calculating the first scaling matrix and the second scaling matrix, performing the frequency domain gain control, and performing the MIMO decoding are performed by one or more processors.

2. The method of claim 1, wherein calculating the first scaling matrix and the second scaling matrix based on the calculated power comprises:
finding a maximum power for one or more elements in the whitened channel matrix; and
calculating the first and the second scaling matrices based on the maximum power.

3. The method of claim 1, wherein performing the MIMO decoding comprises:
performing QR decomposition on the scaled whitened channel matrix to obtain an orthogonal matrix and a diagonal matrix;
performing MIMO decoding on at least the scaled whitened received signal, the orthogonal matrix and the diagonal matrix to obtain a plurality of output values; and
calculating log likelihood ratios (LLRs) of the plurality of output values.

4. The method of claim 3, wherein the plurality of output values are distance values for each data stream and each constellation point.

5. The method of claim 3, wherein the MIMO decoding comprises a maximum likelihood MIMO decoding.

6. The method of claim 3, further comprising:
calculating a third scaling matrix based on the calculated power;
applying inverse operations to the third scaling matrix to obtain an inverse scaling matrix;
multiplying the diagonal matrix with the inverse scaling matrix to obtain a matrix; and
performing MIMO decoding using the obtained matrix.

7. The method of claim 3, wherein calculating the LLRs of the plurality of output values comprises:
calculating the LLRs of the plurality of output values to obtain a first set of LLRs;
applying inverse operations to the first scaling matrix to obtain an inverse matrix; and
multiplying the first set of LLRs by the inverse matrix to obtain a second set of LLRs.

8. The method of claim 1, wherein the one or more subcarriers correspond to an orthogonal frequency division multiplexing (OFDM) representation of a signal from which the whitened channel matrix is estimated technology is used.

9. An apparatus for wireless communications, comprising:
means for calculating power of an estimated whitened channel matrix for each of one or more subcarriers;
means for calculating a first scaling matrix and a second scaling matrix based on the calculated power;
means for performing frequency domain gain control by scaling a whitened received signal using the first scaling matrix and scaling a whitened channel matrix corresponding to the whitened received signal using the second scaling matrix, wherein the first scaling matrix and the second scaling matrix are different matrices; and
means for performing multiple-input multiple-output (MIMO) decoding on at least the scaled whitened received signal and the scaled whitened channel matrix.

10. The apparatus of claim 9, wherein the means for calculating the first scaling matrix and the second scaling matrix based on the calculated power comprises:
means for finding a maximum power for one or more elements in the whitened channel matrix; and
means for calculating the first and the second scaling matrices based on the maximum power.

11. The apparatus of claim 9, wherein the means for performing the MIMO decoding comprises:
means for performing QR decomposition on the scaled whitened channel matrix to obtain an orthogonal matrix and a diagonal matrix;
means for performing MIMO decoding on at least the scaled whitened received signal, the orthogonal matrix and the diagonal matrix to obtain a plurality of output values; and
means for calculating log likelihood ratios (LLRs) of the plurality of output values.

12. The apparatus of claim 11, wherein the plurality of output values are distance values for each data stream and each constellation point.

13. The apparatus of claim 11, wherein the MIMO decoding comprises a maximum likelihood MIMO decoding.

14. The apparatus of claim 11, further comprising:
means for calculating a third scaling matrix based on the calculated power;
means for applying inverse operations to the third scaling matrix to obtain an inverse scaling matrix;
means for multiplying the diagonal matrix with the inverse scaling matrix to obtain a matrix; and
means for performing MIMO decoding using the obtained matrix.

15. The apparatus of claim 11, wherein the means for calculating the LLRs of the plurality of output values comprises:
means for calculating the LLRs of the plurality of output values to obtain a first set of LLRs;
means for applying inverse operations to the first scaling matrix to obtain an inverse matrix; and
means for multiplying the first set of LLRs by the inverse matrix to obtain a second set of LLRs.

16. The apparatus of claim 9, wherein the one or more subcarriers correspond to an orthogonal frequency division multiplexing (OFDM) representation of a signal from which the whitened channel matrix is estimated.

17. An apparatus for wireless communications, comprising:
- a processor;
- memory in electronic communication with the processor; and
- instructions stored in the memory and executable by the processor to:
- calculate power of an estimated whitened channel matrix for each of one or more subcarriers;
- calculate a first scaling matrix and a second scaling matrix based on the calculated power;
- perform frequency domain gain control by scaling a whitened received signal using the first scaling matrix and scaling a whitened channel matrix corresponding to the whitened received signal using the second scaling matrix, wherein the first scaling matrix and the second scaling matrix are different matrices; and
- perform multiple-input multiple-output (MIMO) decoding on at least the scaled whitened received signal and the scaled whitened channel matrix.

18. The apparatus of claim 17, wherein the instructions are executable by the processor to:
- find a maximum power for one or more elements in the whitened channel matrix; and
- calculate the first and the second scaling matrices based on the maximum power.

19. The apparatus of claim 17, wherein the instructions are executable by the processor to:
- perform QR decomposition on the scaled whitened channel matrix to obtain an orthogonal matrix and a diagonal matrix;
- perform MIMO decoding on at least the scaled whitened received signal, the orthogonal matrix and the diagonal matrix to obtain a plurality of output values; and
- calculate log likelihood ratios (LLRs) of the plurality of output values.

20. The apparatus of claim 19, wherein the plurality of output values are distance values for each data stream and each constellation point.

21. The apparatus of claim 19, wherein the MIMO decoding comprises a maximum likelihood MIMO decoding.

22. The apparatus of claim 19, further comprising wherein the instructions are executable by the processor to:
- calculate a third scaling matrix based on the calculated power;
- apply inverse operations to the third scaling matrix to obtain an inverse scaling matrix;
- multiply the diagonal matrix with the inverse scaling matrix to obtain a matrix; and
- perform MIMO decoding using the obtained matrix.

23. The apparatus of claim 19, wherein the instructions are executable by the processor to:
- calculate the LLRs of the plurality of output values to obtain a first set of LLRs;
- apply inverse operations to the first scaling matrix to obtain an inverse matrix; and
- multiply the first set of LLRs by the inverse matrix to obtain a second set of LLRs.

24. The apparatus of claim 17, wherein the one or more subcarriers correspond to an orthogonal frequency division multiplexing (OFDM) representation of a signal from which the whitened channel matrix is estimated.

25. A computer-program product for wireless communications, comprising a non-transitory computer readable medium having instructions stored thereon, the instructions being executable by one or more processors and the instructions comprising:
- instructions for calculating power of an estimated whitened channel matrix for each of one or more subcarriers;
- instructions for calculating a first scaling matrix and a second scaling matrix based on the calculated power;
- instructions for performing frequency domain gain control by scaling a whitened received signal using the first scaling matrix and scaling a whitened channel matrix corresponding to the whitened received signal using the second scaling matrix, wherein the first scaling matrix and the second scaling matrix are different matrices; and
- instructions for performing multiple-input multiple-output (MIMO) decoding on at least the scaled whitened received signal and the scaled whitened channel matrix.

26. The computer-program product of claim 25, wherein the instructions for calculating the first scaling matrix and the second scaling matrix based on the calculated power comprise:
- instructions for finding a maximum power for one or more elements in the whitened channel matrix; and
- instructions for calculating the first and the second scaling matrices based on the maximum power.

27. The computer-program product of claim 25, wherein the instructions for performing the MIMO decoding comprise:
- instructions for performing QR decomposition on the scaled whitened channel matrix to obtain an orthogonal matrix and a diagonal matrix;
- instructions for performing MIMO decoding on at least the scaled whitened received signal, the orthogonal matrix and the diagonal matrix to obtain a plurality of output values; and
- instructions for calculating log likelihood ratios (LLRs) of the plurality of output values.

28. The computer-program product of claim 27, wherein the plurality of output values are distance values for each data stream and each constellation point.

29. The computer-program product of claim 27, wherein the MIMO decoding comprises a maximum likelihood MIMO decoding.

30. The computer-program product of claim 27, further comprising:
- instructions for calculating a third scaling matrix based on the calculated power;
- instructions for applying inverse operations to the third scaling matrix to obtain an inverse scaling matrix;
- instructions for multiplying the diagonal matrix with the inverse scaling matrix to obtain a matrix; and
- instructions for performing MIMO decoding using the obtained matrix.

31. The computer-program product of claim 27, wherein the instructions for calculating the LLRs of the plurality of output values comprise:
- instructions for calculating the LLRs of the plurality of output values to obtain a first set of LLRs;
- instructions for applying inverse operations to the first scaling matrix to obtain an inverse matrix; and
- instructions for multiplying the first set of LLRs by the inverse matrix to obtain a second set of LLRs.

32. The computer-program product of claim 25, wherein the one or more subcarriers correspond to an orthogonal frequency division multiplexing (OFDM) representation of a signal from which the whitened channel matrix is estimated.

* * * * *